United States Patent
Batten et al.

(10) Patent No.: US 7,480,898 B2
(45) Date of Patent: Jan. 20, 2009

(54) SYSTEM AND METHOD FOR BUILDING FULL BATCH TEST ENVIRONMENTS

(75) Inventors: David J Batten, Brighton (GB); Derek C. Eastwood, West Sussex (GB); Stuart Q. Wilson, West Sussex (GB)

(73) Assignee: American Express Travel Related Services Co., Inc., New York, NY (US)

( * ) Notice: Subject to any disclaimer, the term of this patent is extended or adjusted under 35 U.S.C. 154(b) by 951 days.

(21) Appl. No.: 10/710,009

(22) Filed: Jun. 11, 2004

(65) Prior Publication Data

US 2005/0283667 A1  Dec. 22, 2005

(51) Int. Cl.
*G06F 9/44* (2006.01)
(52) U.S. Cl. ..................................... 717/124
(58) Field of Classification Search .................. 717/124
See application file for complete search history.

(56) References Cited

U.S. PATENT DOCUMENTS

| | | | |
|---|---|---|---|
| 6,233,727 B1 * | 5/2001 | Nagasuka et al. ........... 717/114 |
| 6,934,949 B2 * | 8/2005 | Smith et al. ................. 718/101 |
| 7,337,176 B1 * | 2/2008 | Cheedella et al. ........... 707/100 |
| 2003/0055702 A1 * | 3/2003 | Waterston ..................... 705/8 |
| 2004/0078692 A1 * | 4/2004 | Jackson et al. ................ 714/38 |
| 2004/0172632 A1 * | 9/2004 | Smith et al. ................. 718/101 |

* cited by examiner

*Primary Examiner*—Wei Y. Zhen
*Assistant Examiner*—Philip R. Wang
(74) *Attorney, Agent, or Firm*—Fitzpatrick, Cella, Harper & Scinto

(57) ABSTRACT

The invention includes an integrated toolset of software development aids for testing of software systems directed toward the production, access, management, and retrieval of stored data by providing a fast and efficient means for a developer to recreate production data within a testing environment. The toolset consists of components which, when combined, provide an interactive on-line system where a developer is provided with access to low volume, high-quality, depersonalized, and targeted data with referential integrity and is suitable for most testing needs.

18 Claims, 6 Drawing Sheets

SYSTEM AND METHOD FOR BUILDING FULL BATCH TEST ENVIRONMENTS

FIELD OF INVENTION

The present invention relates generally to extracting data from production database systems in order to create a test environment, and more particularly, to a system and method for building batch test environments through automated steps of data extraction, conversion of batch jobs and construction of full batch test environments.

BACKGROUND OF INVENTION

A complex business organization typically includes an extensive computer network system, so businesses are often continually developing and implementing advanced computer software systems in an effort to increase their level of technology. To help achieve these advances, many entities often employ computing and software professionals to lead continual efforts for software upgrades. When changing or upgrading software, computing professionals often need to determine if their software developments are sufficiently compatible within their network system. Developers usually build test environments to test new software in order to optimize the operations and facilitate its practical use. A key component in the development of new software, and common among building test environments, is the need to extract representative data which may be used as inputs during the testing process. However, it is often difficult to maintain the integrity of the extracted data, difficult to mask sensitive data, and cumbersome to enter the data. For example, data is typically manually entered, thereby causing delays and increased costs. Moreover, automating the building of test environments in a complex environment is extremely challenging and often requires a high level of knowledge, experience and technical expertise, as well as a significant level of funding.

Typically, organizations create scripts within a database management system which creates a duplicate set of database tables and populates the tables with data residing in a production database. This can be a more efficient means for creating a test database, however this step alone does not serve to create a full testing environment. Confidential data must be modified manually or a complex script must be written to conduct automatic modifications. Also, executing a suite of test jobs still requires manual execution. This can be time consuming and, as a result, may not provide the most accurate test results. Therefore, a need exists in the industry for a system and method for data extraction while retaining referential integrity.

SUMMARY OF INVENTION

In general, the present invention overcomes the limitations and problems of the prior art by providing a system and method for building a full batch test environment. More particularly, the invention facilitates repeatable scheduled or ad-hoc extraction of production data and the loading of the data to one or more test databases while substantially ensuring data integrity and enforcing privacy policies. In one embodiment, the system may be configured to facilitate building a batch test environment by including a batch on-line builder configured to build a test job; a job converter configured to convert a batch type of the test job; and, a master test database configured to facilitate unload and load process of the test job.

BRIEF DESCRIPTION OF DRAWINGS

A more complete understanding of the present invention may be derived by referring to the detailed description and claims when considered in connection with the Figures, wherein like reference numbers refer to similar elements throughout the Figures, and:

DETAILED DESCRIPTION

The detailed description of exemplary embodiments of the invention herein makes reference to the accompanying drawings, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation.

Figure 1:
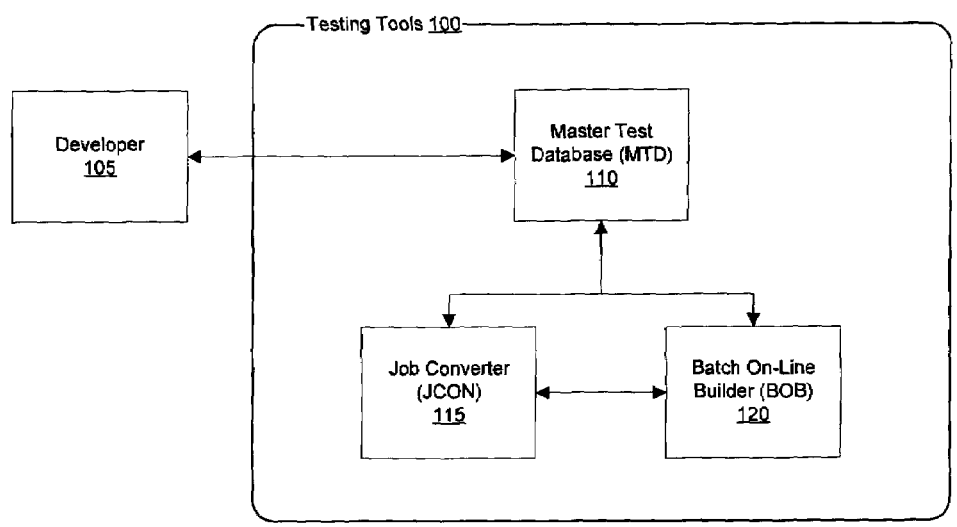
FIG. 1 is a block diagram illustrating the major system components for an exemplary testing tools system.

In general, the invention includes a system and method for building batch (e.g., full or partial batch) test environments from production data. With reference to FIG. 1, the invention may comprise; a developer 105 who facilitates testing procedures through a networked interface to the testing tools 100. Testing tools 100 may comprise a master test database (MTD) 110, a job converter (JCON) 115 and a batch on-line builder (BOB) 120. As will be described in greater detail herein, the three exemplary components of the testing tools 100 work together to create a full batch test environment from production data while ensuring dataset accuracy and referential integrity.

As will be appreciated by one of ordinary skill in the art, the present invention may be embodied as a customization of existing systems, an add-on product, upgraded software, a stand alone system (e.g., kiosk), a distributed system, a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

Testing Tools 100, as used herein, may include any software and/or hardware suitably configured to facilitate building and managing data structures, procedures, programs and the like which may used to test software and/or hardware systems. Further, testing tools 100 may provide data space for data structures, procedures, instructions, programs and the like which have been replicated from production systems and/or another test system. Testing tools 100 may comprise any number of hardware and/or software components which may be in direct communication with other testing tools 100 components via a network or through any number of servers, switches, hubs, routers and the like.

A developer 105, as used herein, may include any individual, business, entity, government organization, software and/or hardware suitably configured to participate in the invention. A developer 105 may facilitate testing of software and/or hardware systems using data provided by the testing tools 100 of the invention. Developer 105 may be equipped with a computing device providing one or more interfaces to one or more of the testing tools 100 components. A developer 105 may interface with the testing tools 100 components directly (i.e. a component terminal) or may connect through a network connection. Further, developer 105 may reside in the same geographic location as the testing tools 100 components, or may connect through any number of network servers and/or switches from any geographic location.

Reference is made in FIGS. 2-6 to various components that are known in the art and may be available commercially. For simplicity, the figures make reference to the invention being implemented within an IBM mainframe environment. As such, components including database and file management systems, operating systems, libraries, programs, scripting languages and the like, are discussed in relation to a typical implementation within an IBM mainframe environment. Practitioners will appreciate that the invention may be implemented in any number of environments ranging from large legacy mainframes to workstation and Internet servers. Further, many of the components as included in the drawings and discussed herein have been included to describe functionality and are not intended to imply that the invention comprises the precise components as discussed. For example, reference is made to IBM's database management system, DB2. Practitioners will appreciate that the invention may also comprise Microsoft SQL Server, Oracle, dBase as well as any other commercially available database management system and/or custom implementation of software and/or hardware with a designed purpose of storing and retrieving data.

Figure 2:
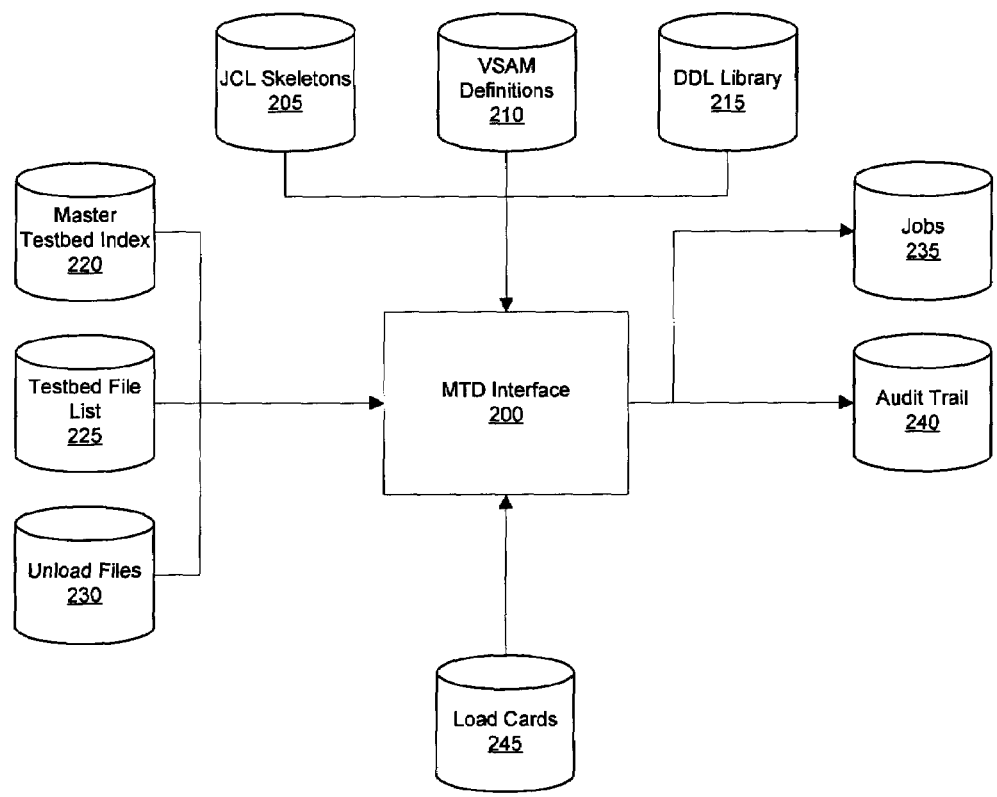
FIG. 2 is a block diagram illustrating the major system components for an exemplary master test database for creating full batch test environments.

Referring to FIG. 2, MTD 200 as used herein, may include any software and/or hardware suitably configured to provide managed access to one or more computing testbeds. MTD 200 may comprise any number of hardware and/or software components including processors, files, databases, database management systems, and the like and may take the form of a standalone system or may reside as one or more software components within any of the testing tools (FIG. 1, 100) system components.

MTD 200 may use a number of components and procedures to facilitate data unload and load processes. Job Control Language (JCL) 205 is a script language, which may be used to control the execution of programs in a batch schedule. A batch file, as known in the art, usually comprises one or more instructions regarding the execution of various programs, commands and/or scripts in order to complete a particular task. Virtual Storage Access Method (VSAM) 210 is the primary mechanism for accessing data on an IBM mainframe. Data Definition Language (DDL) 215 allows a developer to define new database tables and associated elements. DDL 215 is common across most database management systems; however, some may vary accordingly.

MTD 200 may provide functionality to facilitate re-use of previously created jobs and/or testbeds. A master testbed index 220 may provide a developer (FIG. 1, 105) interfacing with MTD 200 with a listing of previously created testbeds. If a testbed already exists that would comply with the requirements of a developer (FIG. 1, 100), then there may be no need to create a new testbed. Each entry within a master testbed index 220 may correspond with a testbed file list 225. Testbed files may include, for example, JCL skeletons 205, VSAM definitions 210, DDL libraries 215 as well as any other files, which may help define a job. Similarly, each entry within a master testbed index may correspond with one or more unload files 230. Unload files 230 may contain data previously produced as a result of a job.

The inputs to MTD 200, as described above, may be used to create a job 235 and load test databases. However, as will be discussed in greater detail, some inputs may by passed to other components within testing tool (FIG. 1, 100) for further processing. When a job 235 is built and executed, it may create a new datastore and load it with data, load an existing datastore with additional data, or delete data within a datastore and load with new data. In either case, MTD 200 may create an audit trail 240 to ensure integrity and provide a view into what processes and datastores were utilized in the creation or modification of a testbed.

Figure 3:
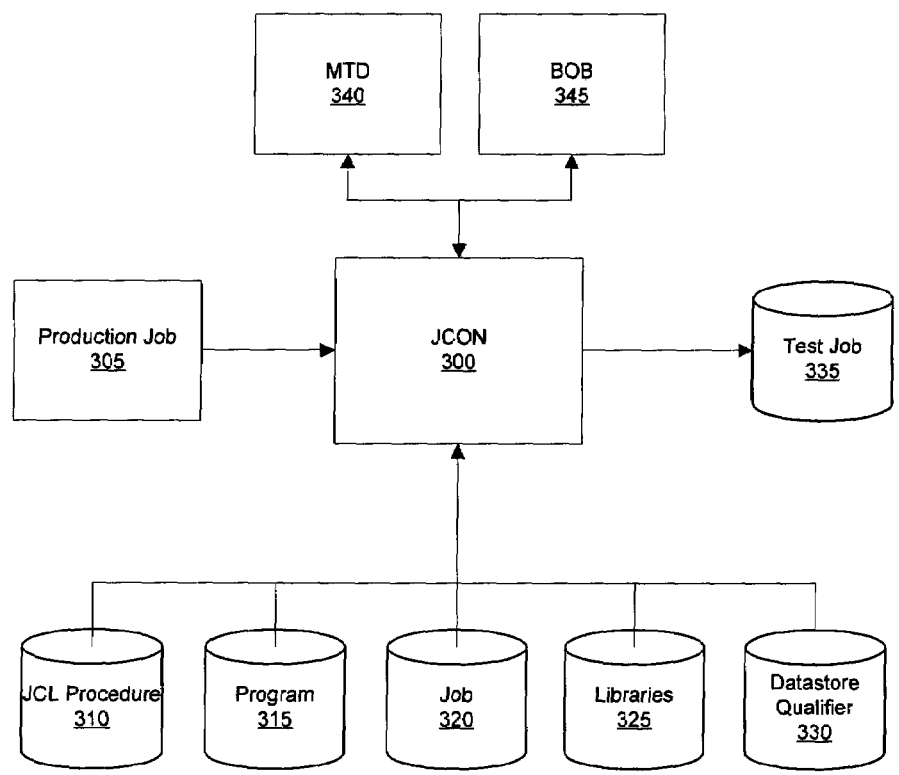
FIG. 3 is a block diagram illustrating the major system components for an exemplary job converter for creating full batch test environments.

Referring to FIG. 3, JCON 300, as used herein, may include any software and/or hardware suitably configured to convert production batch jobs, JCL procedures, SQL stored procedures, and the like to versions suitable for testing. JCON 300 may comprise any number of hardware and/or software components including processors, files, databases, database management systems, and the like and may take the form of a standalone system or may reside as one or more software components within any of the testing tools (FIG. 1, 100) system components.

In cases where building a full batch test environment includes execution of an Information Management System (IMS) batch program, then MTD 340 may interface with JCON 300 to convert batch message processing (BMP) steps to batch data language one (DLI), which may remove the restrictions imposed by the limited number of IMS regions available for testing. Jobs requesting access to databases within IMS may be executed as BMP (Batch Message Process) where the location of the data is specified by IMS. Therefore, there may exist only one set of test databases within a single IMS environment. In order to circumvent this limitation, jobs requesting access to databases within an IMS may be executed as batch DLI that allows for the location of data to be defined within the job itself. Therefore, there may be no limit to the number of test databases that can exist simultaneously. This may produce an ability for one or more developers to conduct testing for one or more programs that access the same database with each test accessing a different set of data. JCON may be invoked to convert BMP jobs to BMP, and to convert BMP to DLI as defined within a parameter accompanying the conversion request. This can facilitate a greater bandwidth for testing where the number of IMS environments available is a restriction.

JCON 300 may also be invoked by BOB 345 to execute a single job conversion and/or multiple background job conversions. Job, as used herein, may comprise a set of instructions including dependency files, commands, programs, libraries, schedules, etc. that may facilitate an extract and load process resulting in a new or updated testbed.

A JCON (step 300) user interface may receive JCL procedures (step 310), programs (step 315), jobs (step 320), and datastore qualifiers (step 330). In addition, JCON (step 300) may receive input regarding where to store converted job libraries, process libraries and development libraries (step 325). After JCON (step 300) performs a conversion process, then job, process and development libraries may be written to, or stored at locations defined within JCON (step 300). Test job (step 335) may represent the converted job which may be transmitted back to a requesting component, which may be either MTD (step 340) or BOB (step 345).

Figure 4:
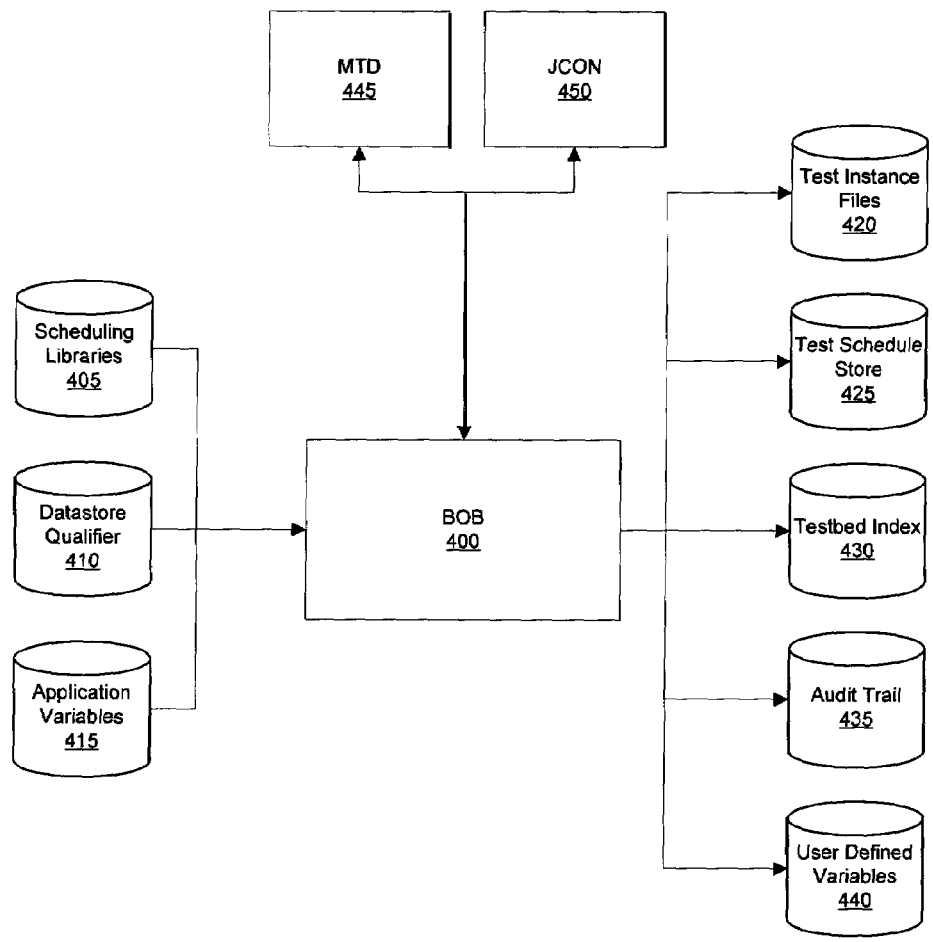
FIG. 4 is a block diagram illustrating the major system components for an exemplary batch online builder for creating full batch test environments.

Referring now to FIG. 4, BOB 400, as used herein, may include any software and/or hardware suitably configured to build batch test environments and interface with other testing tools (FIG. 1, 100) components. BOB 400 may comprise any number of hardware and/or software components including processors, files, databases, database management systems, and the like and may take the form of a standalone system or may reside as one or more software components within any of the testing tools (FIG. 1, 100) system components.

A developer may interact with BOB 400 in order to view production job schedules and create test schedules of jobs based on selected production job schedules. A test schedule may comprise a subset of production jobs. For example, a developer may select one or more production jobs to include and/or exclude from a test schedule. A developer may also define and add additional test jobs that do not exist in a production schedule. A schedule may comprise computing code instructions defining which batch jobs are to be executed in what sequence.

While creating a test schedule, BOB 400 may maintain job sequence dependencies based at least partially upon a corresponding production schedule. BOB 400 may accept inputs from a developer and/or other testing tool (FIG. 1, 100) system components which may be used in building test schedules of jobs. BOB 400 may invoke JCON 450 for a listing of all the jobs in the test schedule 405 in order to create test versions of the jobs ready for execution. JCON 450 may return a list to BOB comprising datastores required for each job. BOB may invoke MTD 445 for a listing of all the datastores 410 required by the jobs in the test schedule to enable a developer to create and/or load test data during test execution. Application variables 415 extracted from production jobs, may be provided to BOB 400 to be included within a test job.

BOB 400 may use the inputs as described above to create test schedules of jobs based on selected production jobs or as defined by a developer. BOB 400 may output a test schedule of jobs which may comprise test instance files 420, test schedule store 425, testbed index 430, audit trail 435, and user defined variables 440. In one embodiment, BOB 400 may format and export a test schedule including file dependencies to another program, such as Microsoft Visio 455 in order to represent a test within a flowchart or any other graphical representation.

Practitioners will appreciate that the functionality of BOB 400 may also be applied to creating test schedules for a variety of other computing platforms, operating systems, database systems, and the like.

The various system components discussed herein may include one or more of the following: a server or other computing systems including a processor for processing digital data; a memory coupled to said processor for storing digital data; an input digitizer coupled to the processor for inputting digital data; an application program stored in said memory and accessible by said processor for directing processing of digital data by said processor; a display device coupled to the processor and memory for displaying information derived from digital data processed by said processor; and a plurality of databases. Various databases used herein may include: user data, debt data, income data, carrier data; financial institution data; and/or like data useful in the operation of the present invention. As those skilled in the art will appreciate, customer computer may include an operating system (e.g., Windows NT, 95/98/1000, OS2, UNIX, Linux, Solaris, MacOS, etc.) as well as various conventional support software and drivers typically associated with computers. Developer computer can be in a home or business environment with access to a network. In an exemplary embodiment, access is through a network or the Internet through a commercially available web-browser software package.

As used herein, the term "network" shall include any electronic communications means which incorporates both hardware and software components of such. Communication among the parties in accordance with the present invention may be accomplished through any suitable communication channels, such as, for example, a telephone network, an extranet, an intranet, Internet, point of interaction device (point of sale device, personal digital assistant, cellular phone, kiosk, etc.), online communications, off-line communications, wireless communications, transponder communications, local area network (LAN), wide area network (WAN), networked or linked devices and/or the like. Moreover, although the invention is frequently described herein as being implemented with TCP/IP communications protocols, the invention may also be implemented using IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, "INTERNET STANDARDS AND PROTOCOLS" (1998); "JAVA 2 COMPLETE," various authors, (Sybex 1999); DEBORAH RAY AND ERIC RAY, "MASTERING HTML 4.0" (1997); and LOSHIN, "TCP/IP CLEARLY EXPLAINED" (1997) and DAVID GOURLEY AND BRIAN TOTTY, "HTTP, THE DEFINITIVE GUIDE" (2002), the contents of which are hereby incorporated by reference.

The various system components may be independently, separately or collectively suitably coupled to the network via data links which includes, for example, a connection to an Internet Provider (ISP) over the local loop as is typically used in connection with standard modem communication, cable modem, Dish networks, ISDN, Digital Subscriber Line (DSL), or various wireless communication methods. See, e.g., GILBERT HELD, "UNDERSTANDING DATA COMMUNICATIONS" (1996), hereby incorporated by reference. It is noted that the network may be implemented as other types of networks, such as an interactive television (ITV) network. Moreover, the system contemplates the use, sale or distribution of any goods, services or information over any network having similar functionality described herein.

Any databases discussed herein may be any type of database, such as relational, hierarchical, graphical, object-oriented, and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. In this regard, the data corresponding to the key field in each of the linked data tables is preferably the same or of the same type. However, data tables having similar, though not identical, data in the key fields may also be linked by using AGREP, for example. In accordance with one aspect of the present invention, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); block of binary (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a Block of Binary (BLOB). Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first issuer, a second data set which may be stored may be provided by an unrelated second issuer, and yet a third data set which may be stored, may be provided by an third issuer unrelated to the first and second issuer. Each of these three exemplary data sets may contain different information that is stored using different data storage formats and/or techniques. Further, each data set may contain subsets of data which also may be distinct from other subsets.

As stated above, in various embodiments of the present invention, the data can be stored without regard to a common format. However, in one exemplary embodiment of the present invention, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, carrier, issuer, user or the like. Furthermore, the security information may restrict/permit only certain actions such as accessing, modifying, and/or deleting data sets. In one example, the data set annotation indicates that only the data set owner or the user are permitted to delete a data set, various identified carriers are permitted to access the data set for reading, and others are altogether excluded from accessing the data set. However, other access restriction parameters may also be used allowing various entities to access a data set with various permission levels as appropriate.

The data, including the header or trailer may be received by a stand alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand alone device, the appropriate option for the action to be taken. The present invention may contemplate a data storage arrangement wherein the header or trailer, or header or trailer history, of the data is stored on the transaction instrument in relation to the appropriate data.

The computers discussed herein may provide a suitable website or other Internet-based graphical user interface which is accessible by users, hosts or operators of the system. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, InterBase, etc., may be used to provide an Active Data Object (ADO) compliant database management system.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), helper applications, plug-ins, and the like. A server may include a web service which receives a request from a web server, the request including a URL (http://yahoo.com/stockquotes/ge) and an IP address (123.56.789). The web server retrieves the appropriate web pages and sends the data or applications for the web pages to the IP address. Web services are applications which are capable of interacting with other applications over a communications means, such as the internet. Web services are typically based on standards or protocols such as XML, SOAP, WSDL and UDDI. Web services methods are well known in the art, and are covered in many standard texts. See, e.g., ALEX NGHIEM, "IT WEB SERVICES: A ROADMAP FOR THE ENTERPRISE" (2003), hereby incorporated herein by reference.

The present invention may be described herein in terms of functional block components, screen shots, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like. Still further, the invention could be used to detect or prevent security issues with a client-side scripting language, such as JavaScript, VBScript or the like. For a basic introduction of cryptography and network security, the following may be helpful references: (1) "Applied Cryptography: Protocols, Algorithms, And Source Code In C," by Bruce Schneier, published by John Wiley & Sons (second edition, 1996); (2) "Java Cryptography," by Jonathan Knudson, published by O'Reilly & Associates (1998); (3) "Cryptography & Network Security: Principles & Practice," by William Stalling, published by Prentice Hall; all of which are hereby incorporated by reference.

Each developer may be equipped with a computing device in order to interact with the system and facilitate the creation of testbeds. The developer may have a computing unit in the form of a personal computer, although other types of computing units may be used including laptops, notebooks, hand held computers, set-top boxes, cellular telephones, touch-tone telephones and the like.

The invention is described herein with reference to screen shots, block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

Figure 5:
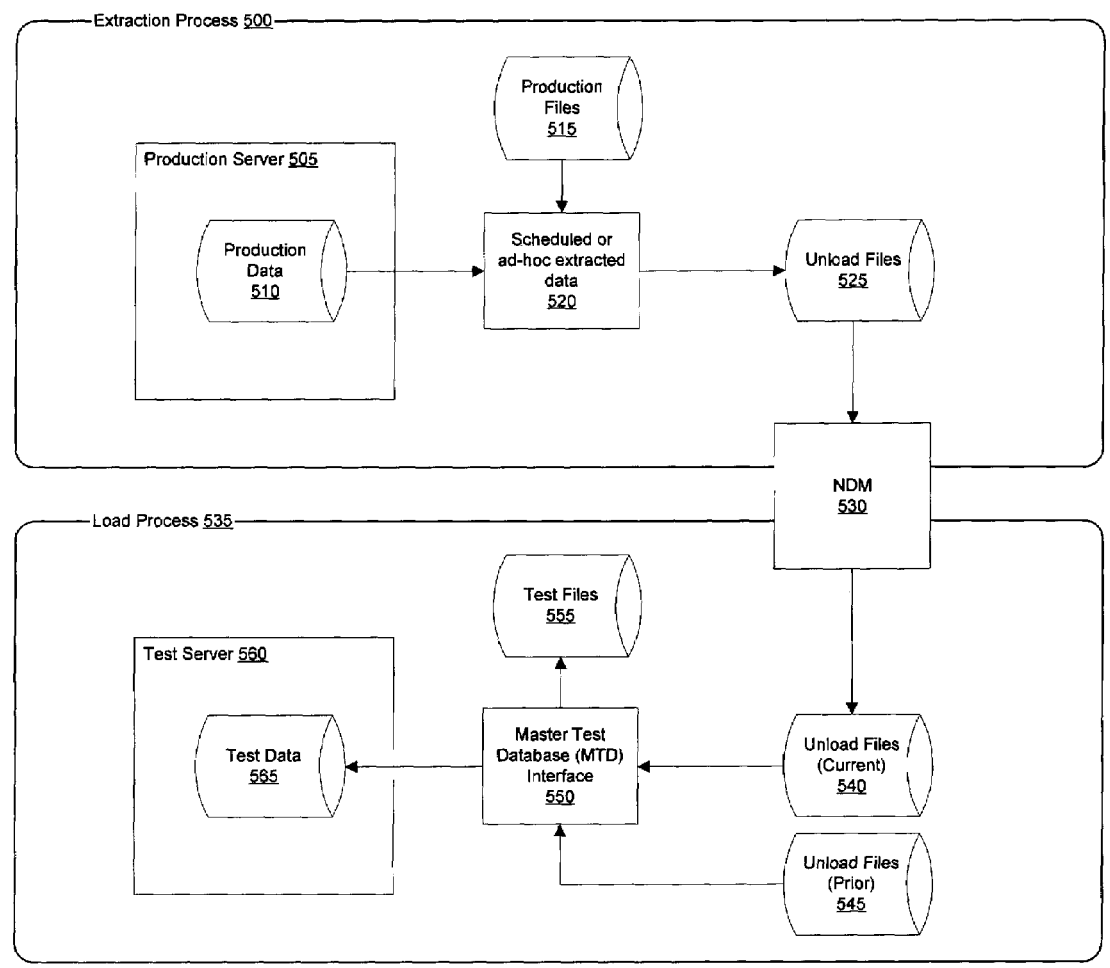
FIG. 5 is a flow chart illustrating an exemplary high level relationship between a data extraction process and a developer interface; and, FIG. 6 is a flow chart illustrating an exemplary method for extracting data from a production system to build a full batch test environment within the context of the invention.
Figure 6:
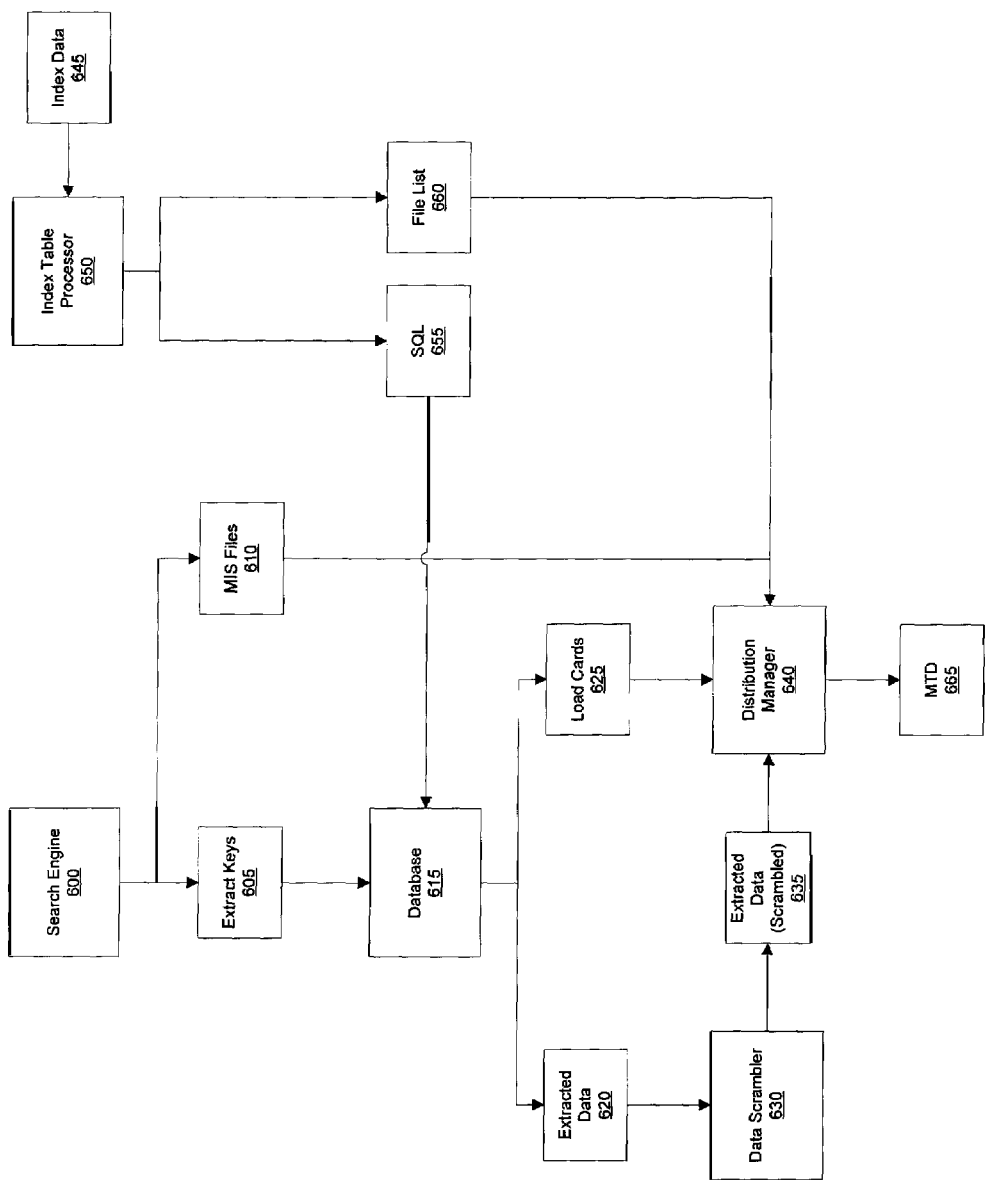

Referring now to FIGS. 5-6, the process flows depicted are merely embodiments of the invention and are not intended to limit the scope of the invention as described herein. For example, the steps recited in any of the method descriptions may be executed in any order and are not limited to the order presented. It will be appreciated that the following description makes appropriate references not only to the steps depicted in FIGS. 5-6, but also to the various system components as described above with reference to FIGS. 1-4. It should be further appreciated that the multiple steps as illustrated and described may be combined into single steps but have been expanded for the sake of simplicity. In other cases, steps illustrated and described as single process steps may be broken down into multiple steps but have been combined for simplicity.

In the descriptions for FIGS. 5-6, common reference is made to the process steps of transacting data transmissions between varying components of the testing tools (FIG. 1, 100). The process steps, whether for transmitting a query, a command, a file, or data to a component within the testing tools (FIG. 1, 100), may be very similar with only minor variances between them. However, a practitioner will appreciate that the steps as described herein may be accomplished through any number of process steps and methods producing similar results. As used herein, "transmit" may include sending electronic data from one system component to another over a network connection. Additionally, as used herein, "data" may include encompassing information such as commands, queries, files, data for storage, and the like in digital or any other form.

FIG. 5 illustrates a high level exemplary relationship between a data extraction process (step 500) and a data load process (step 535). While the extraction and load processes may be initiated from a MTD interface (step 550), FIG. 5 is intended to illustrate the flow of data following a request whether it is a scheduled request or an ad-hoc request. In order to build a testbed and load it with data, the data may be copied from one or more databases within a production server (step 505). Scheduled or ad-hoc extracted data (step 520) may include both extracted production data (step 510) and related production files (step 515) to form the unload files (step 525). Unload files (step 525) may be transmitted to a distribution manger (step 530) where the data may be captured from the mainframe environment and formatted in a manner acceptable to a personal computing environment. The current unload files (step 540) may be transmitted to a MTD interface (step 550) where the test files (step 555) may be separated from the test data (step 560) and likewise stored. Unload files from prior jobs (step 545) may also be activated by a MTD interface (step 550) to load test files (step 555) and test data (step 565) accordingly.

While the above description of FIG. 5 provides only a high-level view of the data extraction process and does not describe the interaction of other components of the invention, practitioners will appreciate that such extraction and load process may encompass any number of steps, processes, transactions and the like. Further, the steps as described may vary according to different implementations of computing and data storage environments. For example, production data (step 510) may not always be located within a production server (step 505) is illustrated, but rather within a legacy mainframe system. Practitioners will also appreciate that the steps as identified as well as the order in which they are presented serve only to demonstrate a common data flow according to an embodiment of the invention and does not limit the scope of the invention.

FIG. 6 illustrates a more detailed view of the exemplary data extraction process and makes reference to FIGS. 2-4 to better explain processing at each step. A MTD (FIG. 1, 110) may provide a search engine (step 600) where a developer may enter criteria that extract data must match. For example, a developer creating a testbed using extracted data from customer account production data may only be interested in data relating to customers with delinquent payment accounts. Therefore, she may make an entry into a search interface within MTD (FIG. 1, 10) to indicate that she would only like to extract data for customers where a last payment received was greater than 90 days prior to the current date. Search parameters may be formatted into extract keys (step 605) which may be used to match production data to a set of key data provided by a search engine (step 600). In another embodiment, a search engine (step 600) interface may provide a list of pre-defined search parameters from which a developer may choose. A search parameter list may be used to define common search parameters such as, for example, data relating to active accounts only, closed accounts, delinquent accounts, account types, and the like.

In addition to extract keys (step 605) an index table processor (step 650) may build another part of an extract process based on contents of an index table (step 645). An index table (step 645) may contain key values for records stored within a specific database (step 615) from which data is to be extracted. Key values identify record locations as well as identify all related records. An index table processor (step 650) may use keys to formulate a Structured Query Language (SQL) statement (step 655). A formulated SQL (step 655) statement may then be executed against a database (step 615) resulting in an extract of data matching parameters defined within the SQL statement. Index table processor (step 650) may also define records stored within a sequential file based database system.

In the illustrated embodiment, the invention may employ one or more DB2 databases which include load cards (step 625) to ensure that data extracted from a DB2 production database table can be effectively received and loaded into a corresponding test database table. Load cards (step 625) may comprise formatting and/or mapping instructions to accompany extracted data (step 620) through a distribution manager (step 640) and to a MTD (step 665). Load cards (step 625) may be employed during a load process in order to insure that the data can be effectively loaded into a test table. Load cards (step 625) may be constructed during a database extraction process (step 615) and may include modifications in the structure of the production table mirrored to the latest set of load cards to prevent a failure in the loading of a test table. A MTD (step 665) interface may merge load cards (step 625) with a skeleton job and the name of the file containing the extracted data (step 620) to create a job that may load the data to a test table as per a developer's personal parameters (e.g. specifying the location of the test tables).

Extracted data (step 620) from a database (step 615) may require that one or more database table fields to be scrambled prior to execution of a load process. This may be required to adhere to privacy concerns and/or policies regarding the dissemination of certain types of information. For example, if a dataset containing customer information includes a field for social security numbers, it may be preferable that such information be scrambled prior to allowing access to the dataset by a developer. Therefore, data deemed to require scrambling may be passed through a data scrambler process (step 630). While not described in greater detail herein, a practitioner will appreciate that there are a number of methods known in the art for encrypting data in a manner to hide the true value. Further, while not illustrated, logic may be employed to allow a system administrator to set parameters indicating what types of data require scrambling. Following a scrambling process (step 630), the extracted data (step 635) may be transmitted to a distribution manager (step 640) where it may be combined with associated data files prior to transmitting the data to a MTD (step 665) where a load process may be performed.

Legacy database systems, such as IBM's Management Information System (MIS), often facilitate data storage through a series of sequential files as opposed to a single database file as is the case with most modern database management systems. Therefore, MTD (FIG. 1, 110) may be capable of facilitating an unload and load process for file based database systems. Search engine (step 600) may match search parameters within a set of MIS files (step 610) in order to extract and transmit file data matching search parameters to a distribution manager (step 640). Distribution manager (step 640) may format and/or package data in order to be received my a MTD (step 665).

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

It should be understood that the detailed description and specific examples, indicating exemplary embodiments of the present invention, are given for purposes of illustration only and not as limitations. Many changes and modifications within the scope of the instant invention may be made without departing from the spirit thereof, and the invention includes all such modifications. Corresponding structures, materials, acts, and equivalents of all elements in the claims below are intended to include any structure, material, or acts for performing the functions in combination with other claim elements as specifically claimed. The scope of the invention should be determined by the appended claims and their legal equivalents, rather than by the examples given above.

The invention claimed is:

1. A system including a processor for building testing software under development, said system comprising:
   a batch on-line builder configured to build a test job schedule based on a predefined sequence in which a plurality of batch test jobs are to be executed;
   a batch test job converter configured to convert said plurality of batch test jobs from batch message processing (BMP) steps into data language one (DL1) step;
   a data modifier configured to modify data extracted from a production database to mask confidential information; and,
   a master test database configured to store said modified data, said modified data being accessible by said converted plurality of batch test jobs during testing of said software under development.

2. The system of claim 1, wherein said batch test job converter is further configured to convert said plurality of batch test jobs by removing restrictions imposed by a limited number of information management systems (IMS) regions available for testing.

3. The system of claim 1, wherein said batch test job converter is further configured to convert said plurality of batch test jobs by defining datastores.

4. The system of claim 1, wherein said batch on-line builder is further configured to build said test job schedule by building at least one of a data environment and a list of test jobs.

5. The system of claim 1, wherein said batch on-line builder is further configured to build said test job schedule by scanning production batch schedules to build a test batch schedule.

6. The system of claim 1, wherein said master test database is further configured to store sets of previously created test data.

7. The system of claim 1, wherein said master test database is further configured to store previously created batch test environments.

8. The system of claim 1, wherein said data modifier further includes a configurable search engine operable to search said production database based on specified criteria.

9. A method for testing software under development, said method comprising:
   building a test job schedule based on a predefined sequence in which a plurality of batch test jobs are to be executed;
   converting said plurality of batch test jobs from batch message processing (BMP) steps into data language one (DL1) steps;
   modifying data extracted from a production database to mask confidential information; and,
   storing said modified data in a database, said modified data being accessible by said converted plurality of batch test jobs during testing of said software under development.

10. The method of claim 9, wherein said converting said plurality of batch test jobs includes removing restrictions imposed by a limited number of information management systems (IMS) regions available for testing.

11. The method of claim 9, wherein said converting said plurality of batch test jobs includes defining datastores.

12. The method of claim 9, wherein said building a test job schedule includes at least one of building a data environment and building a list of test jobs.

13. The method of claim 9, wherein said building a test job schedule includes scanning production batch schedules to build a test batch schedule.

14. The method of claim 9, further including storing sets of previously created test data.

15. The method of claim 9, further including storing previously created batch environments.

16. The method of claim 9, wherein said modifying data includes configuring a search engine operable to search said production database based on specified criteria.

17. A method for testing software under development, said method comprising:
   building a test job schedule based on a predefined sequence in which a plurality of batch test jobs are to be executed;
   converting said plurality of batch test jobs from batch message processing (BMP) steps into data language one (DL1) steps;
   modifying data extracted from said production database to mask confidential information; and,
   storing said modified data in a database, said modified data being accessible by said converted plurality of batch test jobs during testing of said software under development.

18. A method for testing software under development, said method comprising:
   building a test schedule based on a plurality of production batch schedules, said test schedule defining a plurality of batch test jobs and a sequence in which said plurality of batch test jobs are to be executed;
   converting said plurality of batch test jobs from batch message processing (BMP) steps into data language one (DL1) steps;
   modifying data extracted from said production database to mask confidential information; and,
   storing said modified data in a database, said modified data being accessible by said converted plurality of batch test jobs during testing of said software under development.

* * * * *

UNITED STATES PATENT AND TRADEMARK OFFICE
CERTIFICATE OF CORRECTION

PATENT NO. : 7,480,898 B2
APPLICATION NO. : 10/710009
DATED : January 20, 2009
INVENTOR(S) : David J. Batten et al.

It is certified that error appears in the above-identified patent and that said Letters Patent is hereby corrected as shown below:

COLUMN 2

Line 46, "comprise;" should read --comprise--; and "who facilitates" should read --which facilitates--.

COLUMN 3

Line 4, "Testing Tools" should read --Testing tools--.
    Line 7, "may used" should read --may be used--.

COLUMN 4

Line 22, "may by" should read --maybe--.
    Line 66, "Job," should read --A job,--.

COLUMN 8

Line 38, "stand alone" should read --standalone--.

COLUMN 11

Line 7, "manger" should read --manager--.
    Line 25, "is illustrated," should read --as illustrated,--.

COLUMN 12

Line 19, "to be scrambled" should read --be scrambled--.

UNITED STATES PATENT AND TRADEMARK OFFICE
CERTIFICATE OF CORRECTION

| | |
|---|---|
| PATENT NO. | : 7,480,898 B2 |
| APPLICATION NO. | : 10/710009 |
| DATED | : January 20, 2009 |
| INVENTOR(S) | : David J. Batten et al. |

It is certified that error appears in the above-identified patent and that said Letters Patent is hereby corrected as shown below:

<u>COLUMN 13</u>

Line 13, "building" should be deleted.

Signed and Sealed this

Thirtieth Day of June, 2009

JOHN DOLL
*Acting Director of the United States Patent and Trademark Office*